United States Patent [19]
Hamalainen et al.

[11] Patent Number: 6,148,209
[45] Date of Patent: *Nov. 14, 2000

[54] HIGH-SPEED DATA TRANSMISSION IN A DIGITAL MOBILE COMMUNICATION SYSTEM

[75] Inventors: Jari Hamalainen, Tampere; Jari Vainikka, Vantaa, both of Finland; Zhi-Chun Honkasalo, Bedford, Tex.; Harri Jokinen, Hiisi; Harri Posti, Oulu, both of Finland; Harri Honkasalo, Bedford, Tex.

[73] Assignee: Nokia Telecommunications Oy, Espoo, Finland

[*] Notice: This patent issued on a continued prosecution application filed under 37 CFR 1.53(d), and is subject to the twenty year patent term provisions of 35 U.S.C. 154(a)(2).

[21] Appl. No.: 08/676,023

[22] Filed: May 5, 1996

Related U.S. Application Data

[63] Continuation-in-part of application No. PCT/FI95/00526, Sep. 26, 1995.

[51] Int. Cl.$^7$ .................................................. H04B 7/26
[52] U.S. Cl. ......................... 455/450; 455/517; 370/329
[58] Field of Search .................................. 455/433, 450, 455/509, 517, 524, 437, 452, 454, 453; 370/329, 347, 348

[56] References Cited

U.S. PATENT DOCUMENTS

| | | | |
|---|---|---|---|
| 4,432,087 | 2/1984 | Hubbard | 370/55 |
| 4,445,116 | 4/1984 | Grow | 370/455 |
| 4,679,191 | 7/1987 | Nelson et al. | 370/468 |
| 4,949,395 | 8/1990 | Rydbeck | 455/33 |
| 5,200,956 | 4/1993 | Pudney et al. | 370/95.1 |
| 5,307,348 | 4/1994 | Buchholz et al. | 370/348 |
| 5,432,843 | 7/1995 | Bonta | 455/437 |
| 5,499,386 | 3/1996 | Karlsson | 455/437 |
| 5,634,192 | 5/1997 | Meche et al. | 455/437 |
| 5,655,003 | 8/1997 | Erving et al. | 455/434 |
| 5,682,419 | 10/1997 | Grube et al. | 455/450 |
| 5,946,633 | 8/1999 | McAlinden | 455/551 |

FOREIGN PATENT DOCUMENTS

| | | | |
|---|---|---|---|
| 2112762 | 7/1994 | Canada | H04J 3/16 |
| 0 332 818 | 9/1989 | European Pat. Off. | H04Q 7/04 |
| 0 615 393 | 9/1994 | European Pat. Off. | H04Q 7/04 |

*Primary Examiner*—Edward F. Urban
*Attorney, Agent, or Firm*—Pillsbury, Madison & Sutro LLP

[57] ABSTRACT

A data transmission in a digital mobile communication system employing a so-called multi-channel access technique, in which one or more traffic channels may be allocated to a mobile station for data transmission in accordance with the data transfer rate required by the application using the mobile station. Upon establishing a data call, the mobile station indicates to the mobile communication network the maximum and optionally the minimum requirements for the user data transfer rate. The mobile communication network assigns the mobile station for a data call a channel configuration consisting of one or more traffic channels in connection with call set-up or handover, the channel configuration depending on the resources currently available in the mobile communication network and enabling performance of the data channel, which is not lower than the minimum requirement and not higher than the maximum requirement.

33 Claims, 8 Drawing Sheets

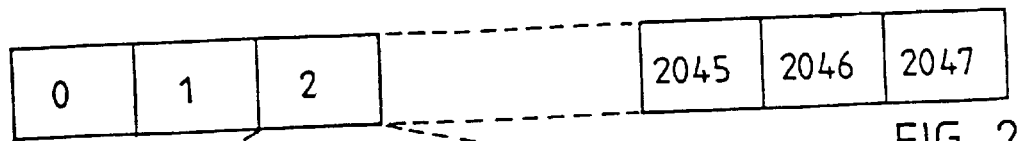
FIG. 2
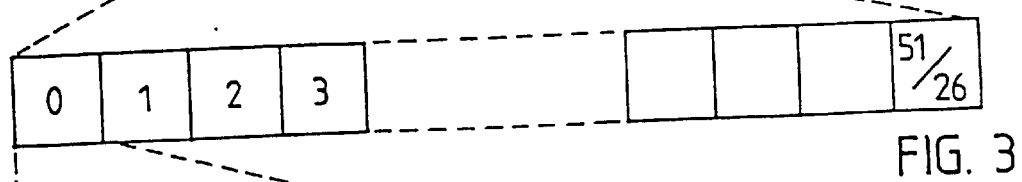
FIG. 3
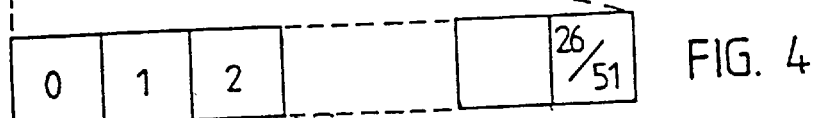
FIG. 4
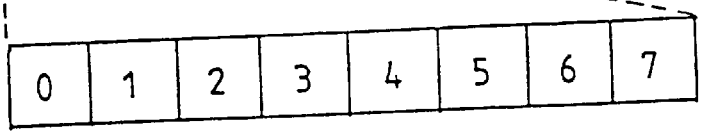
FIG. 5
FIG. 7

HIGH-SPEED DATA TRANSMISSION IN A DIGITAL MOBILE COMMUNICATION SYSTEM

RELATED APPLICATION

This is a continuatiation-in-part (CIP) of International PCT Application PCT/FI95/00526, filed on Sep. 26, 1995.

1. Field of the Invention

The invention relates to a data transmission in a digital mobile communication system.

2. Background of the Invention

There are several multiple access modulation techniques for facilitating communications in which a large number of mobile user are present. These techniques include time division multiple access (TDMA), code division multiple access (CDMA) and frequency division multiple access (FDMA).

In TDMA mobile telecommunication systems time-division communication takes place on the radio path in successive TDMA frames, each of which consists of several time-slots. In each time-slot, a short information packet is sent as a radio frequency burst which has a finite duration and which consists of a set of modulated bits. The time-slots are mainly used for transmitting control channels and traffic channels. On the traffic channels, speech and data are transmitted. On the control channels, signaling between a base station and mobile subscriber stations is carried out. An example of a TDMA radio system is the Pan-European mobile communication system GSM (Global System for Mobile Communications).

CDMA is a modulation and multiple access scheme based on spread spectrum communication. Unlike FDMA or TDMA, in CDMA a large number of CDMA signals (users) simultaneously share the same wide band radio channel, typically 1.25 MHz. Pseudorandom noise (PN) binary codes, so called spreading codes, are used to distinguish between different CDMA signals, i.e traffic channels on the wide band radio channel. A separate spreading code is used over each connection between a base station and a subscriber terminal. In other words, the narrow-band data signal of the user is conventionally multiplied by the dedicated spreading code and thereby spread in bandwidth to the relatively wide band radio channel. The signals of the users can be distinguished from one another in the receivers on the basis of the unique spreading code of each connection, by using a correlator which accepts only signal energy from the selected spreading code and despreads its spectrum into a narrow-band signal. The other users' signals, whose spreading codes do not match the selected spreading code, are not despread in bandwidth, and, as a result, contribute only to the noise and represent a self-interference generated by the system. The spreading codes of the system are preferably selected in such a way that the codes used in each system cell are mutually orthogonal, i.e. they do not correlate with each other. Thus, in the CDMA systems, the spreading code unique to each user or user' signal provides a traffic channel in a similar sense as a time slot in the TDMA systems. CDMA is described in more detail in the document: "An overview of the application of code division multiple access (CDMA) to digital cellular systems and personal cellular networks", Qualcomm Incorporated, 1992, USA, (Document Number EX60-10010).

In traditional TDMA and CDMA mobile communications systems, the maximum data rate at the radio interface is relatively low.

For communication in conventional mobile communications systems, each mobile station is assigned one traffic channel for data or speech transmission. Thus, the GSM system, for instance, may have up to eight parallel connections to different mobile stations on a same carrier wave. The maximum data transfer rate on one traffic channel is restricted to a relatively low level according to the available bandwidth and the channel coding and error correction used in the transmission. In the GSM system, for instance, the rate is 9.6 kbit/s or 12 kbit/s. In addition, in the GSM system a so-called half-rate (max. 4.8 kbit/s) traffic channel may be chosen for low speeds of speech coding. A half-rate channel is established when a mobile station communicates in a certain time-slot only in every other frame, i.e. at half-rate. A second mobile station communicates in the same time-slot of the alternate frames. The capacity of the system in terms of the number of subscribers may thus be doubled, in other words, up to 16 mobile stations may communicate simultaneously on the same carrier wave.

In the last few years, the need for high-speed data services in mobile communication networks has remarkably increased. Data transfer rates of at least 64 kbit/s would be required for utilizing ISDN (Integrated Services Digital Network) circuit switched digital data services, for example. Data services of the public network PSTN, such as modems and telefax terminals of class G3, require higher transfer rates, such as 14.4 kbit/s. One of the growing areas of mobile data transfer that requires higher transfer rates than 9.6 kbit/s is mobile video service. Services of this kind include, e.g., security control by cameras, and video databases. The minimum data transfer rate in video transfer can be, for instance, 16 or 32 kbit/s.

The data transfer rates of the present mobile communication networks are not, however, adequate to satisfy new needs of this kind.

One way to solve the problem is to use several traffic channels, e.g. TDMA time-slots, for one mobile station. In this way, one mobile station may transmit and receive data at higher data transfer rates by multiplexing it to several traffic channels. This is termed as multi-channel access technique.

When several traffic channels are used for one mobile station, problems arise if a sufficient number of channels is not available. This may occur in the call set-up phase, and in connection with handover. Handover refers to transferring a mobile station from one channel onto another channel of the same cell, or to a channel of an adjacent cell, during a call. A problem arises if the mobile station is operating at a high data transfer rate, and the new cell cannot provide after the handover a data transfer rate as high as that of the previous cell. One solution would be to interrupt the connection if the quality, i.e. the data transfer rate of the data transfer service is not adequate in connection with call set-up or handover, or after the handover. However, this solution is not acceptable.

SUMMARY OF THE INVENTION

An object of the present invention is to relieve the problems caused by capacity restrictions in a mobile communication network which employs the multi-channel access technique in data transmission.

This is achieved with the method for data transmission in a digital mobile communication system, in which one or more traffic channels may be allocated to a mobile station for data transmission in accordance with the requirements set by the application using the mobile station, wherein the mobile station indicates, upon setting up a data call, to the mobile communication network a desired level of service for the user data transfer, the mobile communication network assigns the mobile station for a data call a channel configuration consisting of one or more time-slots in connection with call set-up or handover, the channel configuration depending on the resources currently available in the mobile communication network and enabling a data channel performance which is within the limits of the desired level of service.

In the invention, the data transfer rate of a data call is reduced in a mobile communication system employing a so-called multi-channel access technique, when a channel configuration that meets the maximum requirements for the user data transfer rate is not available. This may take place during call set-up or handover. The mobile station may start a high-speed data connection by transmitting to the serving mobile communication network maximum requirements, and optionally also minimum requirements for the user data transfer rate, in addition to the presently specified parameters used for establishing a data call These requirements may include the following parameters: the required grade of service (data transfer rate) and the desired grade of service (data transfer rate). The desired grade of service determines the data transfer rate the mobile station wishes to be able to use. Simultaneously, the desired data transfer rate is the maximum data transfer rate to be allowed for the mobile station. With this parameter, the user of the mobile station may, e.g. call-specifically, in each case choose the most appropriate data transfer service in terms of speed and costs. The required grade of service, if any, determines the minimum data transfer rate that must be provided for ensuring the continuity of data transfer. If the required data transfer rate cannot be provided, the call set-up is interrupted or the data call is interrupted. With this parameter, the user of the mobile station may, e.g. call-specifically, choose the lowest data transfer rate that in each case is sufficient for data transfer purposes. The parameters in accordance with the invention thus provide flexibility to the subscriber of the mobile station in the selection of the data transfer service. Alternatively, the parameters may be fixed at the mobile station, or the mobile station may select the appropriate parameters. These parameters, i.e. the desired and the optional required grade of service, allow the mobile communication network to vary the data transfer rates of individual mobile stations in accordance with the needs and the traffic load of the network, within the limits set by the parameters, and without causing any harm to the users. In particular, these parameters allow the mobile communication network to reduce the data transfer rate if the new cell is not capable of providing the desired data transfer rate in connection with call set-up or handover. Thus, the number of calls interrupted or prevented due to the lack of resources decreases.

Instead of transferring the parameters, the mobile station may indicate the maximum and optional minimum requirements to the mobile communication network in a number of alternative ways, such as indicating the grade of service. The the maximum and possible minimum requirements used are then selected in accordance with the indicated grade of service in the mobile communication network.

It is also possible that the mobile station does not set any standards for the minimum performance of the data transfer rate, or it leaves the minimum performance to be freely chosen by the mobile communication network. As a result, the service of the data call may be continued in the new cell after the handover totally regardless of how the data call was served in the previous cell, or independently of the service provided by the new cell.

The invention also relates to a mobile communication system for implementing the method.

BRIEF DESCRIPTION OF THE DRAWINGS

In the following, the invention will be described in closer detail by way of example with the aid of the preferred embodiments of the invention and with reference to the attached drawings, in which:

FIGS. 2, 3, 4 and 5 illustrate the TDMA frame structure;

FIGS. 6, 7, 8 and 9 are signalling diagrams, which are connected with call set-up, handover within one base station system BSS, handover between base station systems BSS, and handover between mobile services switching centers respectively, in accordance with the invention;

DETAILED DESCRIPTION OF PREFERRED EMBODIMENTS OF THE INVENTION

The present invention can be applied to a high-speed data transmission in digital mobile communication systems utilizing various multiple access methods, such as TDMA or CDMA. In different multiple access methods, the physical concept of traffic channel varies, being primarily defined by a time slot in TDMA systems, a spreading code in CDMA systems, a radio channel in FDMA systems, a combination thereof, etc. The basic concept of the present invention is, however, independent of the type of the traffic channel and the multiple access method used.

Examples of mobile communications systems include the Pan-European digital mobile communication system GSM, DCS1800 (Digital Com-munication System), UMTS (Universal Mobile Telecommuni-cation System), FPLMTS (Future Public Land Mobile Telecommunication System), etc.

Figure 1:
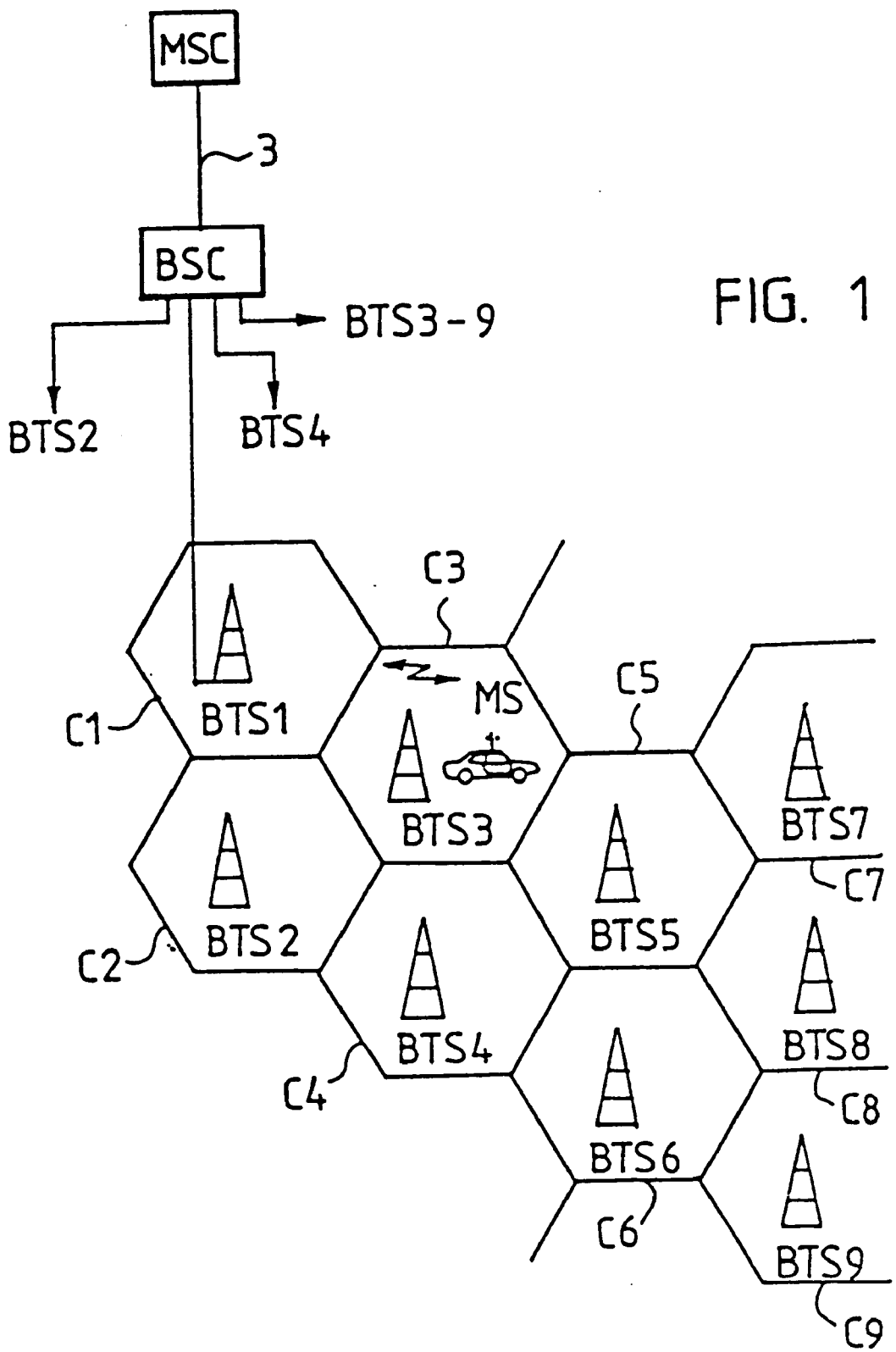
FIG. 1 illustrates a part of the mobile communication system in which the method of the invention may be applied.

FIG. 1 shows a mobile communication system of the same type as GSM by way of example. GSM, (Global System for Mobile Communications) is a pan-European mobile communication system. FIG. 1 shows very schematically the basic structure of the GSM system, not paying closer attention to its characteristics or other aspects of the system. The GSM system is described in greater detail in GSM Recommendations, and in "The GSM System for Mobile Communications", M. Mouly & M. Pautet, Palaiseau, France, 1992, ISBN:2-9507190-0-7, which are incorporated herein by reference.

A mobile services switching center (MSC) is in charge of switching incoming and outgoing calls. It performs similar operations as the exchange of a public switched telephone network (PSTN). In addition, it also performs operations typical of mobile telecommunication only, such as subscriber location management, jointly with the subscriber registers of the network. The GSM system contains at least such subscriber registers as home location registers (HLR) and visitor location registers (VLR), which are not shown in FIG. 1. Specific information on the location of the subscriber, such as the accuracy of the location area, are stored in a visitor location register VLR, the number of which is typically one per each mobile services switching center (MSC). An HLR, in turn, knows the VLR within the area of which a mobile station MS is located. Mobile stations MS are switched to the center (MSC) by means of base station systems. A base station system comprises a base station controller BSC and base stations BTS. One base station controller BSC is used for controlling several base stations BTS. The tasks of the BSC include, e.g., handovers in such cases in which handover is performed within a base station or between two base stations both controlled by the same BSC. FIG. 1 shows, for clarity, one base station system only, in which a base station controller BSC is connected with nine base stations BTS1–BTS9, having respective coverages which, in turn, provide corresponding radio cells C1–C9.

The GSM system is a time division multiple access (TDMA) method in which time-division traffic takes place on the radio path in successive TDMA frames each of which consists of several time-slots. In each time-slot, a short information packet is sent as a radio frequency burst which has a finite duration and which consists of a set of modulated bits. The time-slots are mainly used for transmitting control channels and traffic channels. On the traffic channels, speech and data are transmitted. On the control channels, signalling between a base station and mobile subscriber stations is carried out.

Channel structures used in the radio interface of the GSM system are defined in closer detail in the ETSI/GSM recommendation 05.02. The TDMA frame structure of the GSM system is illustrated by way of example in FIGS. 2–5. FIG. 5 shows one TDMA basic frame, which includes eight time-slots 0–7 used as traffic channels or control channels. Only one radio frequency burst, which is shorter than the duration of a time-slot, is thus transmitted in each time-slot. Once one TDMA basic frame ends in time-slot 7, the time-slot 0 of the following basic time-slot immediately begins. Further, 26 or 51 successive TDMA frames form one multiframe depending on whether a traffic channel or a control channel structure is in question, as illustrated in FIG. 4. A superframe, in turn, consists of 51 or 26 successive multiframes depending on whether the multiframes have 26 or 51 frames, as illustrated in FIG. 3. A hyperframe consists of 2048 superframes, as illustrated in FIG. 2.

In normal operation, a mobile station MS is assigned at the beginning of a call one time-slot as a traffic channel from some carrier wave (single-slot access). The mobile station is synchronized with this time-slot for transmitting and receiving radio frequency bursts.

In data transfer in accordance with the invention, when a mobile station MS requires a data transfer rate higher than can be provided by one traffic channel for transmission of user data, the MS is assigned a channel or a time-slot configuration that comprises two or more time-slots from one or more frames on a same or a different frequency by means of a so-called multi-slot access technique. It is not essential to the present invention which multi-slot access technique is used. An example of a multi-slot access technique for which the present invention is well suited is disclosed in Finnish patent applications 942190 and 942191 (filed on May 11, 1994). In these applications, a high-speed signal is multiplexed to several channels (time-slots) of a lower speed, thus transferred over the radio path and demultiplexed in a receiver back to one signal. These applications respectively correspond to U.S. patent applications of Honkasalo, Ser. No. 08/675,893, filed Jul. 5, 1996 and Honkasalo, Ser. No. 08/676,043, filed Jul. 5, 1996, which are incorporated herein by reference.

As it has been stated previously, however, problems arise in connection with the multi-slot access technique if there is not a sufficient number of channels available. This may occur in the call set-up phase and also in connection with handover.

In accordance with the present invention, the mobile station indicates at the beginning of call set-up the minimum and the maximum requirements for the data transfer rate of user data to the serving mobile communication network. These requirements are two new parameters, in addition to the presently specified parameters used for establishing a data call. Indicating the requirements to the mobile communication network refers herein to all the manners in which a mobile station can indicate the minimum and the maximum requirements, without limiting to direct transmission of the requirements as such. For example, the mobile station may indicate an appropriate grade of service, in which case it is provided at least the performance of the data channel in accordance with the minimum requirement on this grade of service, and the performance of the data channel in accordance with the maximum requirement on this grade of service, at the most.

In the following examples, these minimum and maximum requirements are defined with parameters "required grade of service" and "desired grade of service", but the requirements may be defined in other ways, as well. The desired grade of service determines the data transfer rate, i.e. the channel configuration formed by one or more channels or time-slots that the mobile station wishes to be able to use. Simultaneously, this desired data transfer rate is also the maximum data transfer rate to be allowed to the mobile station. The required grade of service determines the minimum data transfer rate that must be provided for ensuring the continuity of data transfer. With the aid of these parameters, the mobile communication network may, depending on the resources of the network, assign a data call a data transfer rate which is within the limits of the desired data transfer rate and the required data transfer rate. Provided that not even the minimum data transfer rate can be provided, the data call or the call set-up is interrupted. It is also possible in some situations that the mobile station does not set any specific standards for the minimum grade of service of the data transfer rate, or it leaves the minimum performance to be freely chosen by the mobile communication network.

Figure 8:
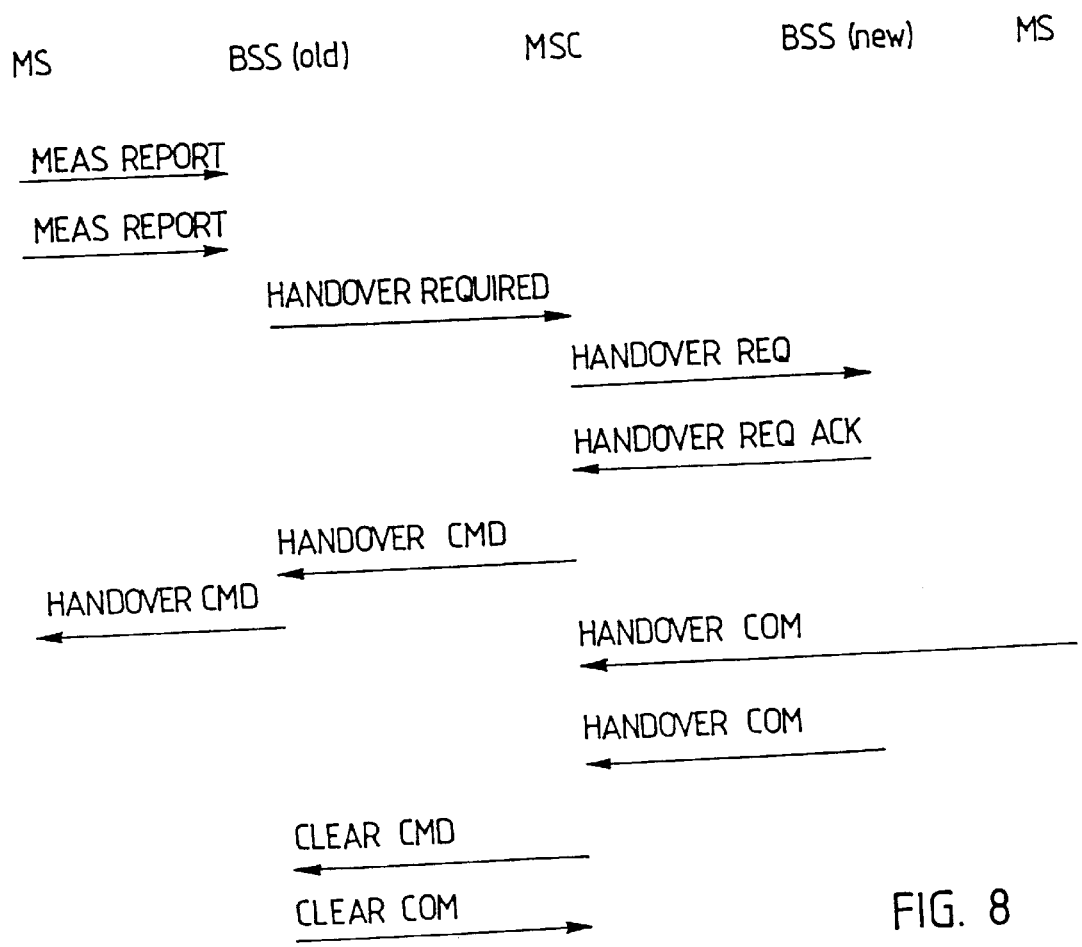
Figure 9:
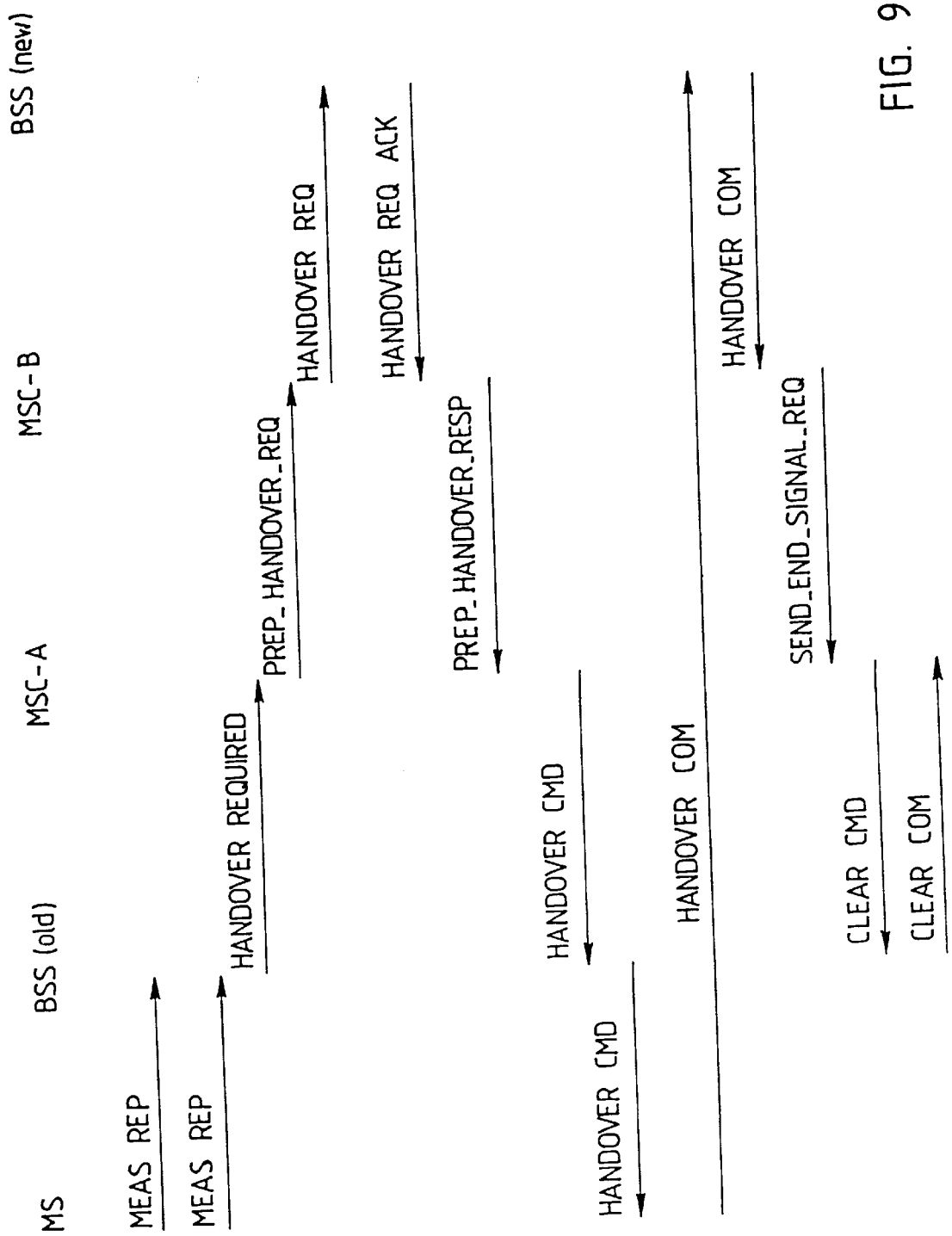

In the following, the invention will be described in closer detail by way of example, in connection with call set-up (FIG. 6), handover within one base station system BSS (FIG. 7), handover between base station systems BSS (FIG. 8), and handover between mobile services switching centres (FIG. 9).

Figure 6:
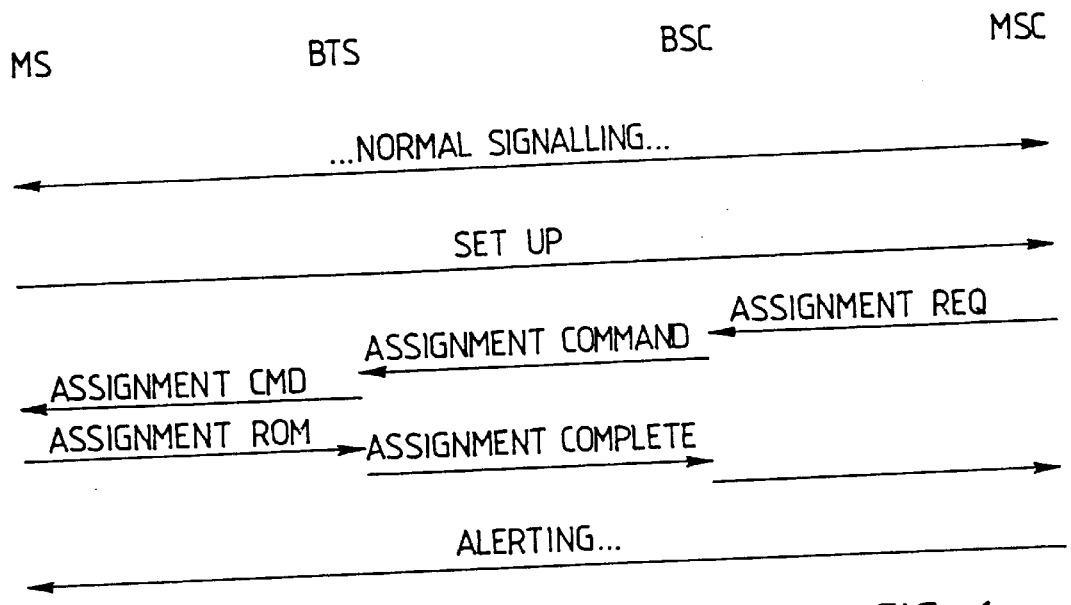

FIG. 6 shows, in connection with call set-up, only the signalling that is essential to disclosing the invention. It must be noticed, however, that in addition to the described signalling messages, other messages are also transmitted in connection with the call set-up, which are not shown herein for clarity, however. As to the GSM system, for instance, this signalling is precisely defined in the GSM specifications concerning call set-up.

In FIG. 6, normal call set-up signalling takes place first, whereafter the MS sends a call set-up message SETUP, which is transmitted to a mobile services switching center MSC. In accordance with the invention, the SETUP message contains, in addition to the parameters heretofore conventionally required for setting up a data connection, two new parameters, the maximum desired data transfer rate DRMAX and the minimum required data transfer rate DRMIN. In the SETUP message of the GSM system, these parameters may be included in a Bearer Capability Information Element BCIE. The BCIE is disclosed in the GSM Recommendation 04.08, version 4.7.0, pages 435–443. The MSC sends a serving base station controller BSC an assignment request message (Assignment REQ), which is modified to contain the parameters DRMAX and DRMIN. The BSC checks whether it has a sufficient capacity for serving the data call, and assigns the data call, depending on the current capacity, some time-slot configuration corresponding to the data transfer rate, which is within the limits of parameters DRMAX and DRMIN. Thereafter, the BSC sends the base station BTS serving the mobile station MS an assignment command message (Assignment Command), which contains the information on the time-slots assigned to the data call and on the assigned data transfer rate. The base station BTS sends the mobile station an assignment command message (Assignment Command), which contains the information on the tine-slots assigned to the data call and on the assigned data transfer rate. The mobile station MS starts to prepare for data transfer in the assigned time-slots, using the given data transfer rate, and sends the base station BTS an assignment acknowledgement (Assignment Complete). The base station BTS sends the base station controller BSC an acknowledgement (Assignment Complete). The BSC, in turn, sends the mobile services switching center MSC an assignment acknowledgement (Assignment Complete), which contains the information on the data transfer rate assigned to the data call by the BSC. After this, normal call set-up signalling takes place for starting the transfer.

If the base station controller BSC is not capable of assigning the data call a time-slot configuration corresponding to the minimum required data transfer rate DRMIN for lack of resources, it will send a report to the MSC, in form of an Assignment Failure message, upon the reception of which MSC interrupts call set-up. The resources that determine the data transfer rate to be assigned to the data call comprise at least the channels, i.e. the time-slots that are available at the base station BTS serving the mobile station at that particular moment.

FIGS. 7–9 show only the signalling that is essential to disclosing the invention. However, it must be noticed that in addition to the signalling messages described above, other messages are also sent in a handover situation, although these messages are not described herein, for clarity. As to the GSM system, for instance, this signalling is precisely defined in the GSM specifications concerning call set-up.

In handover within one base station system BSS illustrated in FIG. 7, the MS regularly reports the measurement results of the signals of the adjacent cells to the base station controller BSC of the serving base station system BSS (Meas Report). The base station controller BSC makes the handover decisions on the basis of the criteria of the radio path by utilizing these measurements, or for other reasons, such as for distributing the capacity. After making the handover decision, the BSC assigns the data call, depending on at least the time-slot resources of the target cell of the handover, a channel configuration that provides a data transfer rate which is at least the minimum required data transfer rate DRMIN and which is not higher than the maximum desired data transfer rate DRMAX. The data transfer rate (time-slot configuration) provided by the new cell is not necessarily the same as that which was provided by the previous cell. In other words, the data transfer rate may increase or decrease in the new cell in accordance with the available resources and within the limits of parameters DRMAX and DRMIN. The base station controller BSC or the base station BTS store parameters DRMAX and DRMIN for every MS that is located within their area and has an ongoing high-speed data call. Provided that the minimum required data transfer rate cannot be provided, the handover attempt will be interrupted, and an adjacent cell, second best in terms of other criteria but able to provide an adequate data transfer rate, will be selected as the new target cell for handover. The BSC sends the MS a handover command message (Handover Command), which contains the information on the allocated data transfer rate, and the description of the allocated time-slots. Now, the MS is able to start communication with the channel configuration allocated in the new cell, and it sends an acknowledgement (Handover Completed) to the base station system BSS. The BSS, in turn, sends the message Handover Performed to the mobile services switching center MSC.

If the handover within a BSS takes place within one cell, so that the data transfer rate does not change, the BSC may send the MS, instead of the Handover Command message, an Assignment Command, which contains information on the allocated data transfer rate and a description by the allocated time-slots. Accordingly, the acknowledgement of the MS is Assignment Complete.

FIG. 8 illustrates handover between two base station systems. An MS sends the serving base station system BSS(old) the results of the measurements (Meas Report) in adjacent cells, which is the case in normal GSM signalling. BSS(old), or its BSC, more precisely, determines the need for handover to a cell of a new base station system BSS (new), e.g. on the basis of the criteria of the radio path. BSS(old) sends the serving mobile services switching center MSC a handover request Handover Required. This message contains, in addition to the standard GSM message, the maximum desired data transfer rate DRMAX and the minimum required data transfer rate DRMIN, given by the MS at the beginning of the data call. Either the base station controller BSC or the base station BTS stores the parameters DRMIN and DRMAX for every MS that is located within their area and has an ongoing high-speed data call. The MSC sends the new base station system BSS(new), or its BSC, to be more precise, a Handover Request, in which the new base station system BSS(new) is requested to provide the requested service. This message also contains, in addition to the standard GSM message, the parameters DRMAX and DRMIN. BSS(new) selects, depending on at least the time-slot resources of the target cell for handover, a time-slot configuration that provides a data transfer rate which is at least the minimum required data transfer rate DRMIN and not higher than the maximum desired data transfer rate DRMAX. The data transfer rate (time-slot configuration) provided by the new cell is not necessarily the same as that which was in the previous cell. In other words, the data transfer rate may increase or reduce in the new cell in accordance with the available resources and within the limits of the respective parameters DRMAX and DRMIN. Provided that the minimum required data transfer rate DRMIN can not be provided, the handover attempt will be interrupted. If there are resources available, BSS(new) sends the MSC an acknowledgement message Request Acknowledge, which contains information on the allocated data transfer rate, and a description of the allocated time-slots. BSS(old) sends the MS a Handover Command message, which contains information on the allocated data transfer rate, and a description of the allocated time-slots. Now, the MS may start communication in a new cell in base station system BSS(new) by using the allocated data transfer rate and the allocated time-slots. The MS sends BSS(new) an acknowledgement Handover Completed, and BSS(new) sends a similar acknowledgement Handover Completed to the mobile services switching center MSC. Thereafter, the MSC releases the resources assigned for the data call in the old base station system BSS(old).

FIG. 9 shows a handover between two mobile services switching centers MSC. A mobile station MS sends the serving base station system BSS(old) the results of the measurements in adjacent cells (Meas Report), which is the case in normal GSM signalling. BSS(old), or its BSC, to be more precise, determines the need for handover to a cell of a new base station system BSS(new) e.g. on the basis of the criteria of the radio path. BSS(old) sends the serving mobile services switching center MSC-A a handover request Handover Required. This message contains, in addition to the standard GSM message, the maximum desired data transfer rate DRMAX and the minimum required data transfer rate DRMIN, given by the MS at the beginning of the data call. Either the base station controller BSC or the base station BTS stores the parameters DRMAX and DRMIN for every MS that is located in their area and has an ongoing high-speed data call. MSC-A sends the new mobile services switching center MSC-B a handover request Prep Handover Req, which contains, in addition to the standard GSM message, the desired parameters DRMAX and DRMIN. MSC-B sends base station system BSS(new), or its BSC, a Handover Request, in which the new base station system BSS(new) is requested to provide the requested service. This message also contains, in addition to the standard GSM message, the parameters DRMAX and DRMIN. BSS(new) selects, depending on at least the time-slot resources of the target cell for handover, a channel configuration that provides a data transfer rate which is not lower the minimum required data transfer rate DRMIN and not higher than the maximum desired data transfer rate DRMAX. The data transfer rate (time-slot configuration) provided by the new cell is not necessarily the same as that which was provided in the previous cell. In other words, the data transfer rate may increase or decrease in the new cell in accordance with the available resources and within the limits of parameters DRMAX and DRMIN. If the minimum required data transfer rate DRMIN cannot be provided, the handover attempt will be interrupted. If there are resources available, BSS (new) sends MSC-B an acknowledgement message Handover Request Acknowledge, which contains information on the allocated data transfer rate, and a description of the allocated time-slots. Thereafter, MSC-B sends the serving center MSC-A an acknowledgement message Prep Handover Resp, which contains information on the allocated data transfer rate, and a description of the allocated time-slots, in addition to the normal content specified in accordance with GSM. MSC-A sends the serving base station system BSS(old) a handover command message Handover Command, which contains information on the allocated data transfer rate, and a description of the allocated time-slots. BSS(old) sends the MS a handover command message Handover Command, which contains information on the allocated data transfer rate, and a description of the allocated time-slots. Now, the MS may start communication in a new cell in base station system BSS(new) by using the allocated channel configuration, and the allocated data transfer rate and the allocated time-slots. The MS sends BSS(new) an acknowledgement Handover Completed, and BSS(new) sends a similar acknowledgement Handover Completed to mobile services switching center MSC-B. Thereafter, MSC-B sends the serving center MSC-A an acknowledgement message Send End Signal Req, from which MSC-A knows that the MS has shifted to a new base station system in MSC-B. Thereafter, resources assigned for the data call are released in the old base station system BSS(old).

As noted above, the present invention is universally applicable on various; kinds of multiple access methods and traffic channels. In CDMA systems, the traffic channels are defined by pseudorandom noise (PN) codes, i.e. spreading codes, assigned to each user or connection. From the present invention point of view, the CDMA traffic channel is similar to the TDMA traffic channel. The basic contribution of the present invention is to allocate parallel traffic channels to a single user so as to provide a high-speed data connection.

Figure 10:
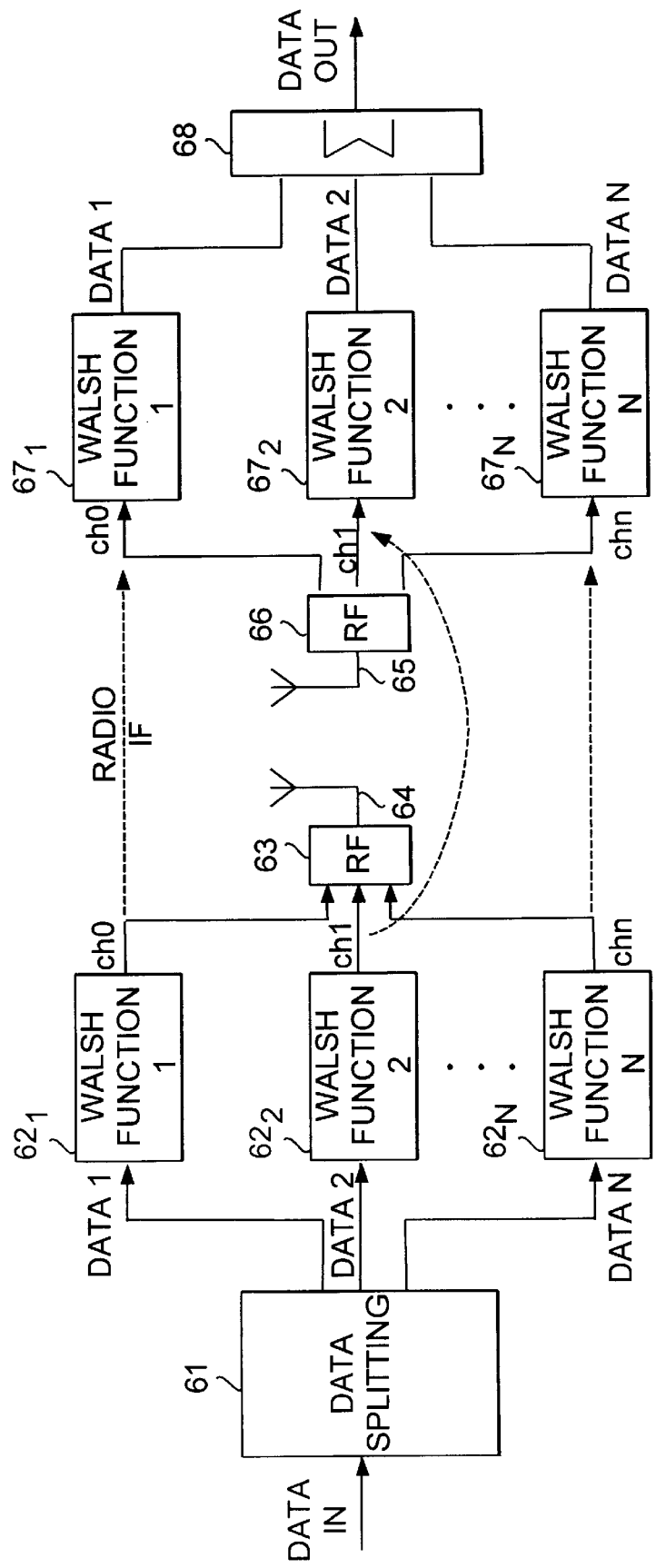
FIGS. 10, 11A and 11B illustrate a high-speed data transmission according to the present invention over N parallel CDMA traffic channels.

Such a high-speed data transmission according to the present invention over N parallel CDMA traffic channels is illustrated in FIG. 10. A high-speed data signal DATAIN that is to be transmitted over the radio path is divided in a data splitter 61 into the required number of slower-speed data signals DATA1 . . . DATAN. A respective number N of parallel CDMA traffic channels ch0 . . . chn is allocated for the transmission. In other words, a unique spreading code is allocated for each slower-speed signal DATA1 . . . DATAN in order to distiquish these signals from each other during simultaneous transmission over the radio interface. The spreading codes of the system are preferably selected in such a way that the codes used in each system cell are mutually orthogonal, i.e. they do not correlate with each other. One class of suitable orthogonal binary sequences is called the Walsh function. In the embodiment shown in FIG. 10 the traffic channel separation is done by coding (multiplying) each lower-speed data stream DATA1 . . . DATAN by modified Walsh functions 1 . . . N of length 255 in respective Walsh encoders $62_1$ . . . $62_N$, in order to spread the data streams in bandwidth. The Walsh function is modified so that the last bit of each of the functions has been deleted. The spread-spectrum data streams are fed through radio frequency (RF) parts 63 to an antenna 64 for transmission over the radio interface.

The RF signal received at receiving antenna 65 is fed through radio frequency (RF) parts 66 and split in parallel to correlator branches $67_1$ . . . $67_N$. Correlators $67_1$ . . . $67_N$ are Walsh decoders, each of which decodes (multiplies) the received spread-spectrum signal by the Walsh function 1 . . . N of the respective CDMA traffic channel ch0 . . . chn, in order to despread the signal in bandwidth and to restore the original bandwidth of the respective slow-speed data stream DATA1 . . . DATAN. The restored slow-speed data streams DATA1 . . . DATAN are combined in a combiner 68 into a high-speed data stream DATAOUT.

A data transmission according to the present invention through the parallel CDMA traffic channels can thus be accomplished according to similar principles as described above for TDMA traffic channels. The only difference is that spreading codes (e.g. Walsh functions) are used instead of time slots as traffic channels.

Typically, there are various coding and signal processing operations, such as channel coding (convolutional coding), symbol repetition, interleaving, etc., involved with the data transmission. Details of these additional operations are not essential for understanding the of present invention. In the embodiment of FIG. 10, it is assumed that these coding and interleaving operations, if any, are done to the high-speed data streams DATAIN and DATAOUT prior to the data splitting 61 and subsequent to data combining 68.

Figure 11A:
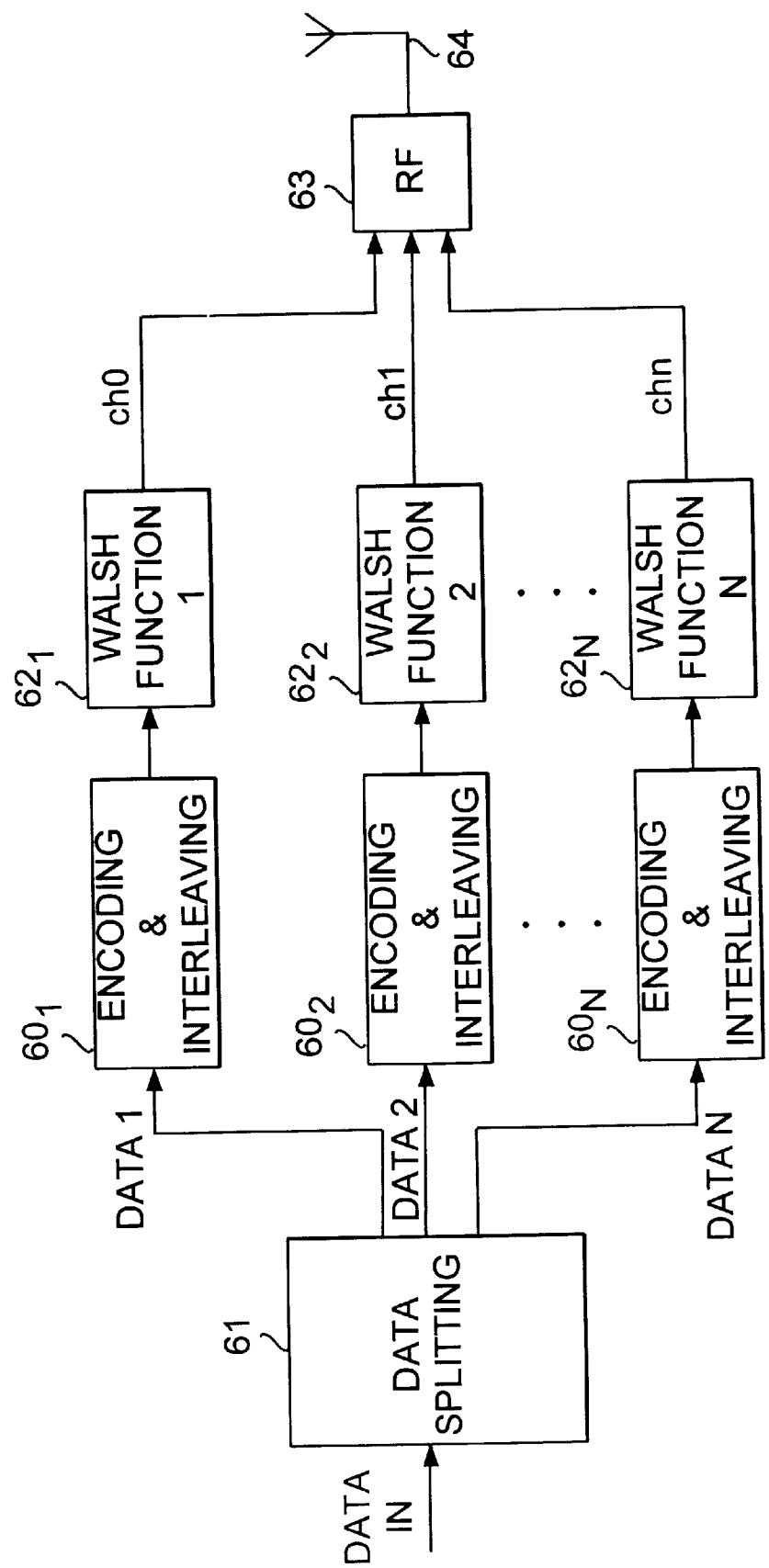
Figure 11B:
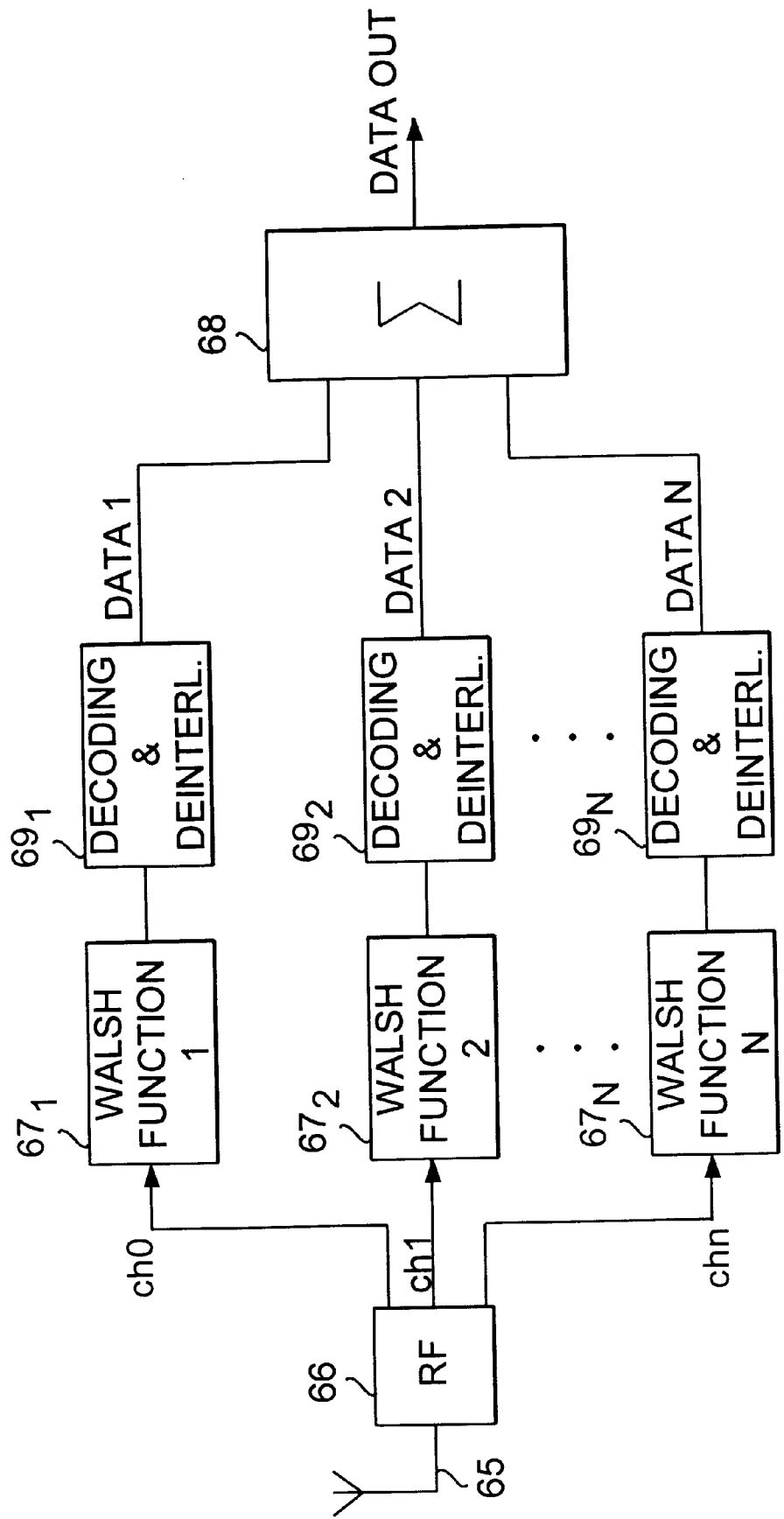

In another embodiment, illustrated in FIGS. 11A and 11B, the channel coding, interleaving and other additional operations are done separately on each slow-speed data stream DATA1 . . . DATAN. To this end, encoding and interleaving blocks $60_1 \ldots 60_N$ are provided between the data splitter 61 and the Walsh encoders $62_1 \ldots 62_N$ in the transmitter of FIG. 11A. Similarly, decoding and deinterleaving blocks $69_1 \ldots 69_N$ are provided between the Walsh decoders $67_1 \ldots 67_N$ and the data combiner 68 in the receiver of FIG. 11B.

Figure 12:
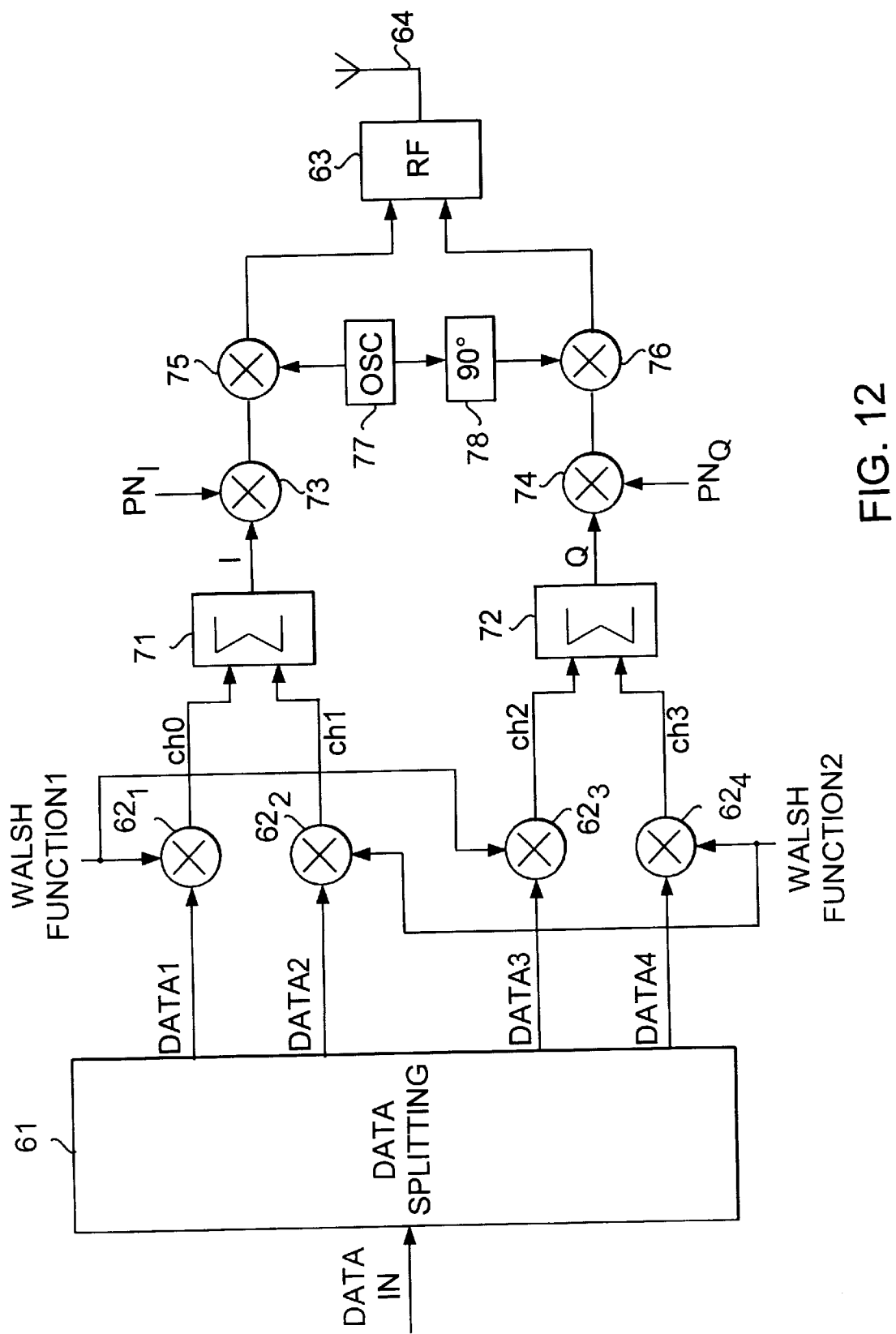
FIG. 12 shows a CDMA transmitter in which four CDMA traffic channels can be divided between quadrature (Q) and in-phase (I) branches in a QPSK modulator.

The RF parts 63 and 66 normally comprise transmitting and receiving filters. Often also a QPSK (Quadrature Phase Shift Keying) modulator is used. FIG. 12 shows an example of how four channels can be divided between quadrature (Q) and in-phase (I) branches in a QPSK modulator. High-speed data signal DATAIN is split into slow-speed data streams DATA1 . . . DATA4 and fed to multipliers $62_1 \ldots 62_4$ (Walsh encoders), respectively. In multipliers $62_1$ and $62_3$, data streams DATA1 and DATA3 are multiplied by Walsh funtion 1. Similarly, in multipliers $62_2$ and $62_4$, data streams DATA2 and DATA4 are multiplied by Walsh funtion 2. The outputs of multipliers $62_1$ and $62_2$ are summed in summing block 71, and fed to the I branch of the QPSK modulator. The outputs of multipliers $62_3$ and $62_4$ are summed in summing block 72, and fed to the Q branch of the QPSK modulator. The signals of the I and Q branches are multiplied by different spreading codes $PN_I$ and $PN_Q$ in multipliers 73 and 74, respectively. The actual spreading is done by these "outer" spreading codes. The resulting I and Q signals multiplied by the in-phase (from local oscillator 77) and quadrature (via 90 degree phase shifter 78 from the oscillator 77) oscillator signals, and fed through other RF parts 63 to antenna 64.

The figures and the explanation connected therewith are only intended to illustrate the present invention. The invention may vary in its details within the scope of the attached claims.

We claim:

1. A method for data transmission in a digital mobile communication network, in which two or more traffic channels can be allocated to a mobile station for data transmission at a higher speed than that supported by any single one of the traffic channels, in accordance with requirements set by an application using the mobile station, comprising:

said mobile station setting-up a data call for data transmission requiring two or more traffic channels;

said mobile station indicating to said mobile communication network a desired level of service for a user data transfer on said data call for data transmission requiring two or more traffic channels; and said mobile communication network assigning said mobile station for said data call a channel configuration consisting of one or more traffic channels in connection with call set-up or handover of said data call, said channel configuration depending on resources currently available in said mobile communication network and enabling a data channel performance which is within the limits of said desired level of service.

2. The method as claimed in claim 1, further comprising:

the mobile station determining said desired level of service at least partly in terms of a maximum requirement for a user data transfer rate or for a channel configuration of said data call as an upper limit.

3. The method as claimed in claim 1, further comprising:

the mobile station determining said desired level of service in terms of both a maximum requirement and a minimum requirement for a user data transfer rate or for a channel configuration of said data call respectively as an upper limit and a lower limit, and said data channel performance being enabled by said network in said enabling step, to be between said upper and lower limits.

4. The method as claimed in claim 3, further comprising:

interrupting said setting-up, or an attempted handover of said data call by said mobile communication network if there are not sufficient resources available in said mobile communication network for providing said minimum requirement set by said mobile station for said desired level of service.

5. The method as claimed in claim 1 or 2, wherein:

said resources of said mobile communication network subject to said assigning include at least at least one of traffic channel resources of a currently serving cell and traffic channel resources of a target cell for a handover attempt.

6. The method as claimed in claim 5, wherein said setting-up of said data call comprises:

sending, by said mobile station to a serving mobile services switching center a call set-up message indicating said desired level of service;

sending from said serving mobile services switching center to a serving base station system an assignment request message, which indicates said desired level of service;

selecting in said serving base station system, depending at least in part on a traffic channel of a serving base station of said serving base station system, a channel configuration that meets said desired level of service as said channel configuration;

sending from said serving base station to said mobile station an assignment command message, which contains the information on said channel configuration allocated to said data call;

sending from said mobile station to said serving base station an assignment acknowledgement; and sending from said serving base station to said mobile services switching center an assignment acknowledgement.

7. The method as claimed in claim 1, further comprising:

recording in said serving base station system said desired level of service indicated by said mobile station, for controlling said channel configuration.

8. The method as claimed in claim 1, wherein said assigning is practiced in connection with a handover with a serving base station, which handover comprises:

measuring at said mobile station downlink signals of cells of said mobile communication network adjacent to a cell of a base station which is a currently serving base station in base station system in relation to said mobile station;

sending from said mobile station to said serving base station system results of said measurement;

determining at said serving base station system need for said handover within said serving base station system;

selecting at said serving base station system, depending on at least the traffic channel resources of a target cell for handover, a channel configuration as an allocated channel configuration that meets said desired level of service;

sending from said serving base station system to said mobile station a handover command, which contains information on said allocated channel configuration; and changing said mobile station over to use said allocated channel configuration in accordance with said handover command, in said target cell.

9. The method as claimed in claim 1, wherein said assigning is practiced in connection with a handover between a serving base station and a new base station system, which handover comprises:

measuring at said mobile station downlink signals of cells adjacent to a given cell of said serving base station system, including at least one cell of said new base station system;

sending from said mobile station to said serving base station system results of said measurement;

determining at said serving base station system need for said handover to said new base station system;

sending from said serving base station system to a serving mobile services switching center a handover request, which indicates said desired level of service;

sending from said serving mobile services switching center to said new base station system a handover request, which indicates said desired level of service;

selecting at said new base station system, depending at least in part on traffic channel resources of a target cell of said new base station system for handover, a channel configuration as an allocated channel configuration within limits of said desired level of service;

sending from said new base station system to said serving mobile services switching center an acknowledgement message, which contains information on said allocated channel configuration;

sending from said serving mobile services switching center to said serving base station system a handover command, which contain information on said allocated channel configuration;

sending from said serving base station system to said mobile station a handover command, which contains information on said allocated channel configuration; and changing said mobile station over to use said allocated channel configuration in accordance with said handover command, in said target cell.

10. The method as claimed in claim 1, wherein said assigning is practiced in connection with a handover between a serving mobile services switching center and a new mobile services switching center, which handover comprises:

measuring at said mobile station downlink signals of cells adjacent to a given cell served by said serving mobile switching center including at least one cell served by said new mobile services switching center;

sending from said mobile station to a serving base station system served by said serving mobile services switching center results of said measurement;

determining at said serving base station system determining need for said handover to a new base station system located within an area of said new mobile services switching center;

sending from said serving base station system to said serving mobile services switching center a handover request indicating said desired level of service;

sending from said serving mobile services switching center to said new mobile services switching center a handover request indicating said desired level of service;

sending from said new mobile services switching center to said new base station system a handover request indicating said desired level of service;

selecting at said new base station system, depending at least in part on traffic channel resources of a target cell of said new base station system for handover, a channel configuration as an allocated channel configuration within limits of said desired level of service;

sending from said new base station system to said new mobile services switching center an acknowledgement message, which contains information on said allocated channel configuration;

sending from said new mobile services switching center to said serving mobile services switching center a handover command, which contains information on said allocated channel configuration;

sending from said serving mobile services switching center to said serving base station system a handover command, which contains information on said allocated channel configuration;

sending from said serving base station system to said mobile station a handover command message, which contains information on said allocated channel configuration; and changing said mobile station over to use said allocated channel configuration in accordance with said handover command, in said target cell.

11. The method as claimed in claim 2, wherein:

said desired level of service as indicated by said mobile station does not does not include a lower limit for minimum performance for said user data transfer rate or said channel configuration; and said assigning includes said lower level of minimum performance being chosen by said mobile communication network.

12. The method as claimed in claim 1, wherein:

said indicating includes indicating a maximum for said desired level of service by said mobile station; and said assigning includes selecting a minimum for said desired level of service by said mobile communications network.

13. The method according to claim 1, wherein:

said digital mobile communication network is provided as part of a code division multiple access (CDMA) system, and said one or more traffic channels are CDMA traffic channels.

14. The method according to claim 13, wherein:

said one or more traffic channels are provided as a plurality of CDMA traffic channels which are distinguished from each other by respectively having different spreading codes.

15. The method according to claim 13, wherein:

said one or more traffic channels are provided as a plurality of CDMA traffic channels which are distinguished from each other by respectively having different Walsh functions.

16. A digital mobile communication network, in which two or more traffic channels are allocatable to a mobile station for data transmission at a higher speed than that supported by any single one of said traffic channels, in accordance with the requirements set by an application using said mobile station, said mobile station including a means for initiating and a means for indicating, said mobile communication network including a means for assigning a channel configuration, said network comprising:

said means for initiating setting up a data call for said data transmission at said higher speed, requiring two or more channels;

said means for indicating indicating to said mobile communication network a desired level of service for a user data transfer for said data call for said data transmission at said higher speed, requiring two or more channels; and said means for assigning a channel configuration assigning to said mobile station for said data call in connection with call set-up or handover a channel configuration consisting of one or more traffic channels, said channel configuration depending on resources currently available in said mobile communication network and enabling data channel performance which is within the limits of said desired level of service.

17. The network as claimed in claim 16, wherein said desired level of service is arranged to be presented in terms of a maximum requirement for a user data transfer rate or as a channel configuration of said data call.

18. The network as claimed in claim 16, wherein:

said desired level of service is arranged to be presented in terms of both a maximum requirement, as an upper limit, and a minimum requirement, as a lower limit, for a user data transfer rate or a channel configuration of said data call.

19. The network as claimed in claim 16, wherein:

a minimum for said desired level of service is arranged to remain undefined by said mobile station.

20. The network as claimed in claim 16, wherein:

a minimum for said desired level of service is arranged to be selectable by said mobile communications network.

21. The network as claimed in claim 18 or 19, wherein:

said mobile communication network is arranged to interrupt a call set-up or a handover attempt of a data call if there are not sufficient resources available in said mobile communication network for providing said minimum requirement or said minimum requirement or said minimum for said desired level of service.

22. The network as claimed in claim 16, wherein:

said resources of said mobile communication network include at least one of traffic channel resources of a serving cell and traffic channel resources of target cell for a handover.

23. The network according to claim 16, wherein:

said digital mobile communication network is provided in a code division multiple access (CDMA) system, and said one or more traffic channels are provided as a plurality of CDMA traffic channels.

24. The network according to claim 23, wherein:

said CDMA traffic channels are distinguished from each other by respectively having different spreading codes.

25. The network according to claim 23, wherein:

said CDMA traffic channels are distinguished from each other by respectively having different Walsh functions.

26. A mobile station for a digital mobile communication system, in which one or more traffic channels are allocatable to a mobile station for data transmission at a higher speed than that supported by any single one of said traffic channels, in accordance with the requirements set by an application using said mobile station, said mobile station including a means for initiating and a means for indicating, said mobile station comprising:

said means for initiating setting up a data call for data transmission at said higher speed, requiring two or more traffic channels;

said means for indicating indicating to a mobile communication network a desired level of service for a user data transfer for said data call for data transmission at said higher speed, requiring two or more traffic channels in order to enable said mobile communication network to assign said mobile station for said data call a channel configuration consisting of one or more traffic channels in connection with call set-up or handover, said channel configuration depending on resources currently available in the mobile communication network and enabling data channel performance which is within the limits of said desired level of service.

27. The mobile station as claimed in claim 26, wherein:

said mobile station is arranged to present said desired level of service in terms of a maximum requirement for a user data transfer rate or a channel configuration of said data call.

28. The mobile station as claimed in claim 26, wherein:

said mobile station is arranged to present said desired level of service in terms of a maximum requirement and a minimum requirement for a user data transfer rate or a channel configuration of said data call.

29. The mobile station as claimed in claim 26, wherein:

said mobile station is arranged to leave a minimum for said desired level of service undefined.

30. The mobile station as claimed in claim 26, wherein:

said mobile station is arranged to leave a minimum for said desired level of service to be selected by said mobile communication network.

31. The mobile station according to claim 26, wherein:

said mobile station is arranged to operate in a digital mobile communication system which is a code division multiple access (CDMA) system, and in which said one or more traffic channels are a plurality of CDMA traffic channels.

32. The mobile station according to claim 31, wherein:

said CDMA traffic channels are distinguished from each other by respectively having different spreading codes.

33. The mobile station according to claim 31, wherein:

said CDMA traffic channels are distinguished from each other by respectively having different Walsh functions.

* * * * *

UNITED STATES PATENT AND TRADEMARK OFFICE
CERTIFICATE OF CORRECTION

PATENT NO. : 6,148,209
DATED : November 14, 2000
INVENTOR(S) : HAMALAINEN et al.

It is certified that error appears in the above-identified patent and that said Letters Patent is hereby corrected as shown below:

On title page

Please change [22] Filing date from "May 5, 1996" to --July 5, 1996--.

Signed and Sealed this

Twenty-ninth Day of May, 2001

Attest:

NICHOLAS P. GODICI

Attesting Officer

Acting Director of the United States Patent and Trademark Office

UNITED STATES PATENT AND TRADEMARK OFFICE
CERTIFICATE OF CORRECTION

| | |
|---|---|
| PATENT NO. | : 6,148,209 |
| APPLICATION NO. | : 08/676023 |
| DATED | : November 14, 2000 |
| INVENTOR(S) | : Jari Hamalainen et al. |

Page 1 of 1

It is certified that error appears in the above-identified patent and that said Letters Patent is hereby corrected as shown below:

On title page, item 30 Foreign Application Priority Data add --Sept. 27, 1994 (FI) 944487--.

Signed and Sealed this

Seventeenth Day of April, 2007

JON W. DUDAS
*Director of the United States Patent and Trademark Office*